United States Patent
Li et al.

(10) Patent No.: US 9,256,359 B2
(45) Date of Patent: Feb. 9, 2016

(54) TOUCH CONTROL METHOD AND ELECTRONIC DEVICE USING THE SAME

(71) Applicant: Acer Incorporated, New Taipei (TW)

(72) Inventors: Chien-Hung Li, New Taipei (TW); Yu-Hsuan Shen, New Taipei (TW); Yueh-Yarng Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 43 days.

(21) Appl. No.: 14/314,048

(22) Filed: Jun. 25, 2014

(65) Prior Publication Data

US 2015/0103001 A1    Apr. 16, 2015

(30) Foreign Application Priority Data

Oct. 16, 2013  (TW) ............................... 102137373 A

(51) Int. Cl.
- *G06F 3/033* (2013.01)
- *G06F 3/0488* (2013.01)
- *G06F 3/0486* (2013.01)

(52) U.S. Cl.
CPC ............ *G06F 3/0488* (2013.01); *G06F 3/0486* (2013.01)

(58) Field of Classification Search
CPC ....... G06F 1/169; G06F 3/033; G06F 3/0338; G06F 3/0362; G06F 3/048; G06F 3/0485; G06F 3/0486; G06F 3/0488; G06F 2203/04803
See application file for complete search history.

(56) References Cited

U.S. PATENT DOCUMENTS

| | | | | |
|---|---|---|---|---|
| 5,347,628 A * | 9/1994 | Brewer | .................. | G06F 3/0481 715/775 |
| 5,664,128 A * | 9/1997 | Bauer | .................... | G06F 3/0483 715/708 |
| 6,157,367 A * | 12/2000 | Van Der Haar | ....... | G06F 3/0486 715/856 |
| 6,677,965 B1 * | 1/2004 | Ullmann | ............. | G06F 3/04812 715/786 |
| D706,826 S * | 6/2014 | McLean | ........................ | D14/491 |
| 2006/0071913 A1 * | 4/2006 | Wang | .................... | G06F 3/0488 345/173 |
| 2006/0244735 A1 * | 11/2006 | Wilson | .................. | G06F 3/0488 345/173 |
| 2007/0192731 A1 * | 8/2007 | Townsend | ............. | G06F 3/0488 715/788 |
| 2010/0156813 A1 * | 6/2010 | Duarte | .................. | G06F 3/0488 345/173 |
| 2011/0102336 A1 * | 5/2011 | Seok | .................... | F06D 3/04886 345/173 |
| 2011/0231796 A1 * | 9/2011 | Vigil | .................... | G06F 3/04883 715/810 |
| 2011/0281652 A1 | 11/2011 | Laverdiere | | |
| 2012/0092340 A1 * | 4/2012 | Sarnoff | ................. | G06T 11/203 345/420 |
| 2013/0167088 A1 | 6/2013 | Mangum et al. | | |
| 2014/0240232 A1 * | 8/2014 | Yang | ..................... | G06F 3/0488 345/158 |
| 2015/0074607 A1 * | 3/2015 | Li | ........................ | G06F 3/04812 715/835 |
| 2015/0153925 A1 * | 6/2015 | Li | ......................... | G06F 3/0488 715/768 |

FOREIGN PATENT DOCUMENTS

| | | |
|---|---|---|
| CN | 103052937 | 4/2013 |
| JP | 06-161665 | 6/1994 |

* cited by examiner

*Primary Examiner* — Joe H Cheng

(74) *Attorney, Agent, or Firm* — Jianq Chyun IP Office

(57) ABSTRACT

A touch control method, adapted for an electronic device with a touch screen is provided. The method includes the step of displaying a touch cursor on the touch screen, wherein the touch cursor includes a positioning point; detecting whether a dragging object exists around the positioning point; and moving the dragging object to be associated with the positioning point of the touch cursor and moving the dragging object according to a movement of the positioning point when determined that the dragging object exists around the positioning point and an operating signal corresponding to a dragging action of the touch cursor is received from the touch screen.

10 Claims, 5 Drawing Sheets

TOUCH CONTROL METHOD AND ELECTRONIC DEVICE USING THE SAME

CROSS-REFERENCE TO RELATED APPLICATION

This application claims the priority benefit of Taiwan application serial no. 102137373, filed on Oct. 16, 2013. The entirety of the above-mentioned patent application is hereby incorporated by reference herein and made a part of this specification.

BACKGROUND OF THE INVENTION

1. Field of the Invention

The invention relates to an electronic device, and more particularly, to a touch control method and an electronic device using the same.

2. Description of Related Art

With continuous development of the technology, mobile electronic devices such as a smart phone or a tablet computer gradually become an indispensable role in daily lives of people. In most cases, a touch screen is disposed in a mobile electronic device or even in an AIO (All-In-One) computer to facilitate users in intuitive operations thereby improving user experience.

However, in case a display interface with higher resolution is provided in the electronic devices such as said tablet computer or the AIO computer, or in case smaller icons or objects are included in a display interface configured by an operating system, for a user who touches the touch screen with fingers for operating the electronic device, such touch control with fingers is not precise enough. Accordingly, operations may not be controlled normally or smoothly, resulting in low user experience of the electronic device.

SUMMARY OF THE INVENTION

The invention is directed to a touch control method and an electronic device for the user to easily control a touch screen of the electronic device.

The touch control method of the invention is adapted for an electronic device with a touch screen, and the method includes the steps of: displaying a touch cursor on the touch screen, wherein the touch cursor includes a positioning point; detecting whether a dragging object exists around the positioning point; and moving the dragging object to be aligned with the positioning point of the touch cursor and moving the dragging object according to a movement of the positioning point when determined that the dragging object exists around the position of the positioning point and an operating signal corresponding to a dragging action of the touch cursor is received from the touch screen.

The electronic device of the invention includes: a touch screen and a processing unit coupled to the touch screen. Therein, the processing unit controls the touch screen to display a touch cursor, and the touch cursor includes a positioning point. The processing unit detects whether a dragging object exists around the positioning point. The processing unit moves the dragging object to be aligned with the positioning point of the touch cursor and moves the dragging object with a movement of the positioning point when the processing unit determines that the dragging object exists around the position of the positioning point and an operating signal corresponding to a dragging action of the touch cursor is received from the touch screen.

Based on above, the touch control method and the electronic device provided by the invention are capable of determining whether the dragging object exists around the touch cursor on the display screen, and allowing the user to easily drag said object through touch control when the dragging object exists.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
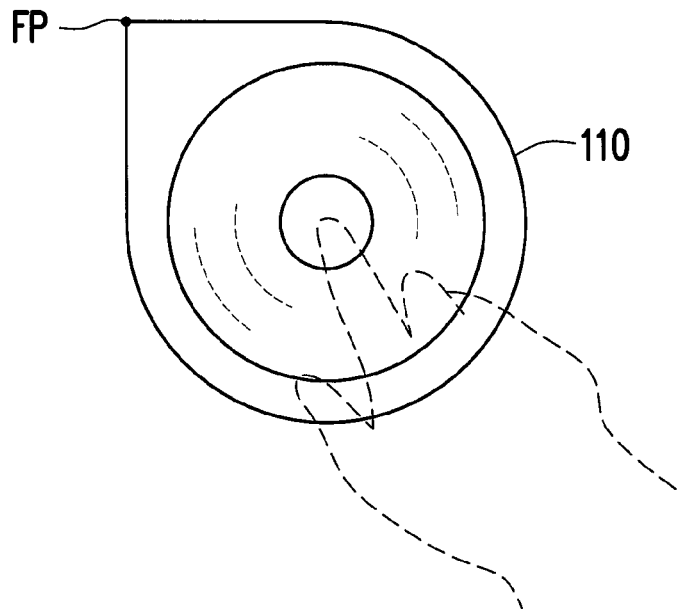
FIG. 1 is a schematic diagram illustrating a touch cursor according an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Reasons that objects on a display interface of a touch screen are difficult for a user to select and drag include restriction in design of the objects on the display interface (e.g., a window border is a narrow object), or a situation in which fingers of the user are too thick, which are why the objects cannot be tapped and dragged to a desired position. The user may need to tap the touch screen repeatedly for several times before an ideal operating result may be achieved.

FIG. 1 is a schematic diagram illustrating a touch cursor according an embodiment of the invention. Referring to FIG. 1, when the user intends to perform a precise operation through a touch panel, an operating gesture (e.g., pressing the screen for at least a predetermined time) may be utilized to call out a touch cursor 110 (e.g., displaying the touch cursor after it is determined that an operating signal corresponding to pressing the screen for at least the predetermined time is received), so that the user may move the touch cursor 110 to select an object (e.g., an icon corresponding to an application on the display interface) overlapping with a positioning point FP.

While the user is performing a touch control by using the touch cursor 110, a dragging action may also be completed. For instance, by moving the touch cursor 110 while pressing the touch cursor 110, so that a plurality of objects may be selected as a whole, or the object may be selected and moved. However, completing the dragging action by using the touch cursor 110 is disadvantageous in that the user needs to precisely move the touch cursor 110 above the object (i.e., for overlapping with a part of the object) before the dragging action can be started. Nevertheless, for the object that is configured with a narrower width (e.g., a scroll bar, window border and so on), it is still difficult to precisely select the object by utilizing the touch cursor 110, thus the dragging action is still difficult for the user to complete.

Therefore, the invention provides a touch control method and an electronic device using the same, capable of allowing the user to intuitively operate the object which is more difficult to select for dragging.

Figure 2:
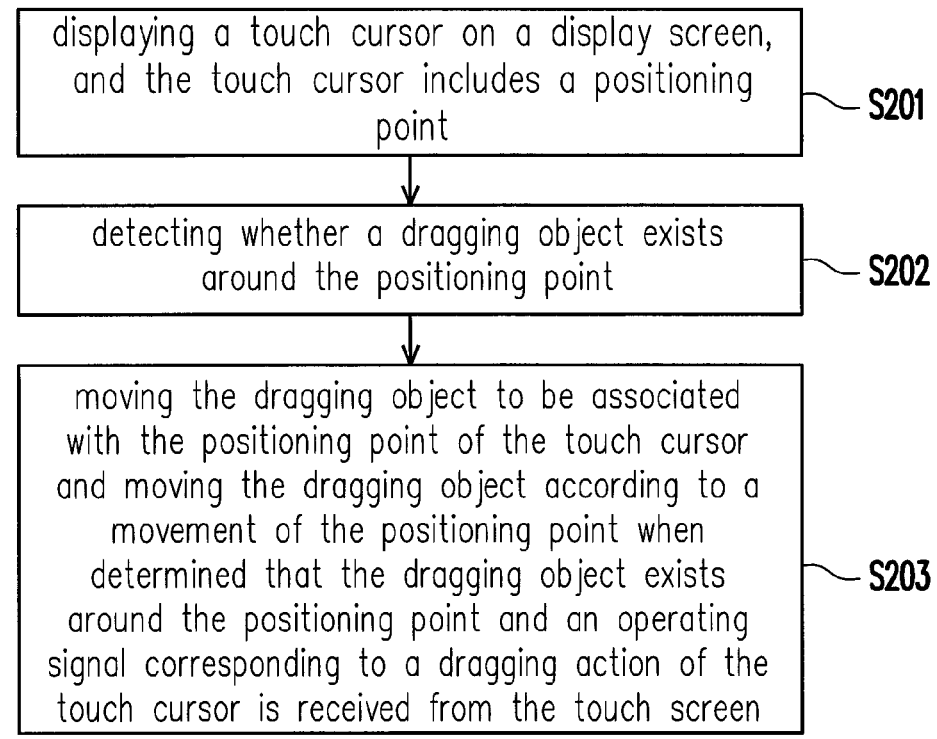
FIG. 2 is a flowchart illustrating a touch control method according an embodiment of the invention.

FIG. 2 is a flowchart illustrating a touch control method according an embodiment of the invention. The touch control method is adapted for an electronic device which includes a touch screen. Referring to FIG. 2, in step S201, a touch cursor is displayed on the touch screen, and the touch cursor includes a positioning point (e.g., as shown in FIG. 1, the touch cursor 110 that includes the positioning point FP). Then, in step S202, whether a dragging object exists around the positioning point is detected. Subsequently, in step S203, the dragging object is moved to be associated with the positioning point of the touch cursor and the dragging object is moved according to a movement of the positioning point when determined that the dragging object exists around the positioning point and an operating signal corresponding to a dragging action of the touch cursor is received from the touch screen.

Figure 3:
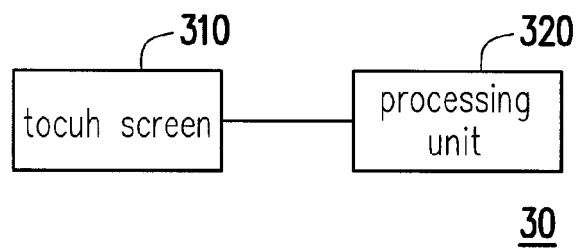
FIG. 3 is a block diagram illustrating an electronic device according to an embodiment of the invention.

FIG. 3 is a block diagram illustrating an electronic device according to an embodiment of the invention. Referring to FIG. 3, an electronic device 30 includes a touch screen 310 and a processing unit 320 coupled to the touch screen 310. Therein, the processing unit 320 controls the touch screen 310 to display a touch cursor, and the touch cursor includes a positioning point. The processing unit 320 detects whether a dragging object exists around the positioning point. The processing unit 320 moves the dragging object to be associated with the positioning point of the touch cursor and moves the dragging object according to a movement of the positioning point when the processing unit 320 determines that the dragging object exists around the position of the positioning point and an operating signal corresponding to a dragging action of the touch cursor is received from the touch screen 310.

In the invention, the dragging object refers to various items for the user to select or configure on the touch screen 310. In the invention, said dragging object could be mainly classified into two types, including a boundary-type dragging object and a bar-type dragging object. Although an icon in a common application may also be dragged by the user in general uses, such selection is relatively easier for the user to select, and thus related description thereof is not discussed herein.

Figure 4:
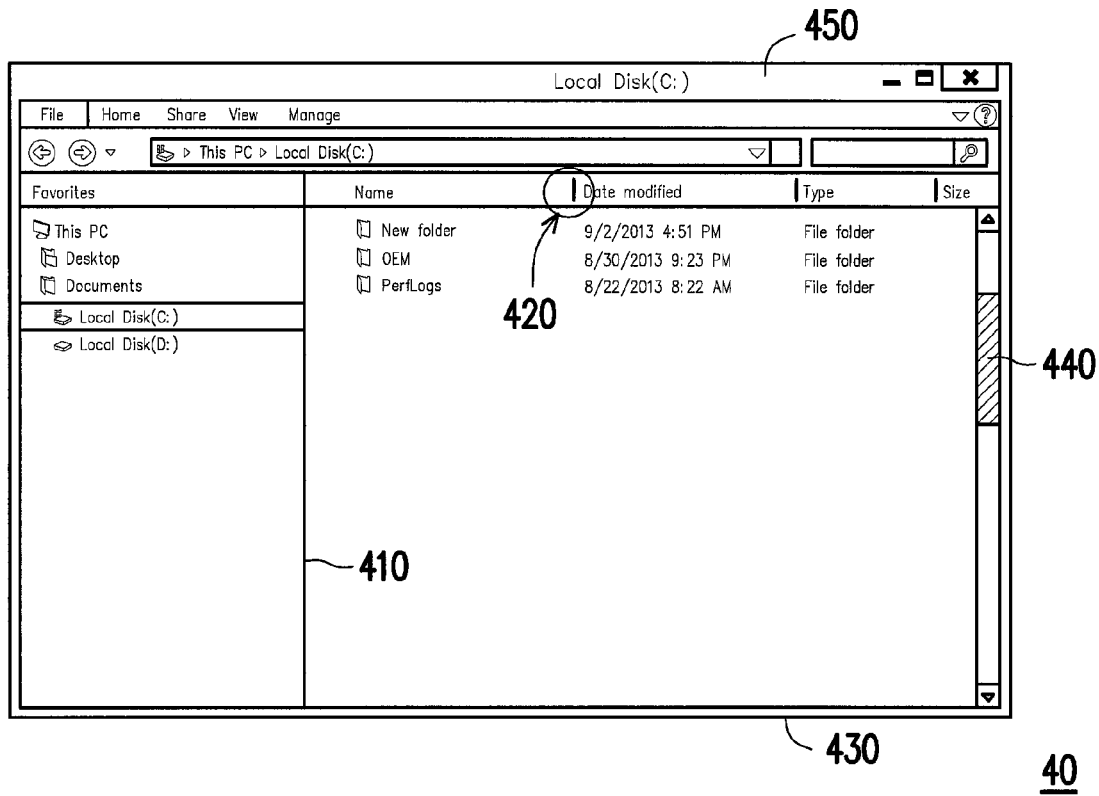
FIG. 4 is a schematic diagram illustrating a relation between a display interface and a dragging object of a touch screen according to an embodiment of the invention.

FIG. 4 is a schematic diagram illustrating a relation between a display interface and a dragging object of a touch screen according to an embodiment of the invention. Therein, a display interface 40 of the touch screen depicted in FIG. 4 is a display interface of Windows operating system (which is represented concisely). Referring to FIG. 4, in the display interface 40, the boundary-type dragging object at least includes a folder directory boundary 410, a classification field boundary 420, and a window border 430. A problem regarding the boundary-type dragging object is that, due to restriction in design of the display interface, the boundary-type dragging object cannot occupy too much space. If a method such as increasing width is used to make the boundary-type dragging object easier to select, the design of the display interface may be ruined to lose sense of aesthetics.

Figure 5A:
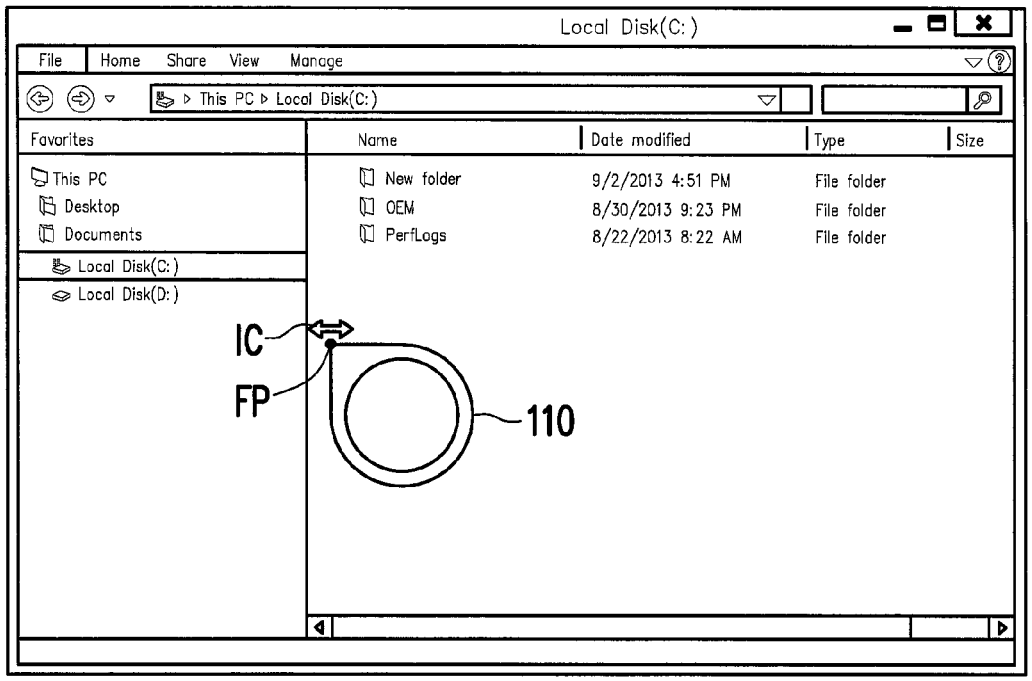
FIG. 5A is a schematic diagram illustrating a relation between a boundary-type dragging object and the touch cursor in the display interface according to an embodiment of the invention.

FIG. 5A is a schematic diagram illustrating a relation between a boundary-type dragging object and the touch cursor in the display interface according to an embodiment of the invention. Referring to FIG. 5A, in the present embodiment, the processing unit 320 establishes a search area according to the positioning point FP, and searches all search positions (e.g., a plurality of pixels in the search area) in the search area for determining whether a boundary-type dragging object exists in one of the search positions. A skill for establishing the search area according to the positioning point FP may be, for example, establishing a circular search area having a predetermined radius with the positioning point FP as a center, or establishing a square search area having a predetermined length with the positioning point FP as a center. A searching skill may be, for example, sending an inquiry signal to the operating system operated by the processing unit 320 for each of the search positions (e.g., each pixel) in the search area, so as to inquire each pixel whether one dragging object is corresponding thereto. Then, a confirmation signal would be replied by the operating system for determining whether one dragging object, or even one boundary-type dragging object is corresponding to any pixel in the search area. Nevertheless, the invention is not limited to above-said configurations.

In the present embodiment, when the processing unit 320 determines that the boundary-type dragging object exists in the search area, the processing unit 320 may display a dragging icon IC around the positioning point FP of the touch cursor 110, so as to notify the user that one boundary-type dragging object (which is available for dragging) exists around the positioning point FP of the touch cursor 110.

Meanwhile, if the user operates the touch cursor 110 to generate a dragging action (e.g., the processing unit 320 receives an operating signal corresponding to action of long pressing the touch cursor on the touch screen 310, or an operating signal corresponding to action of long pressing and moving), the processing unit 320 may then determine that the user intends to drag that boundary-type dragging object.

Figure 5B:
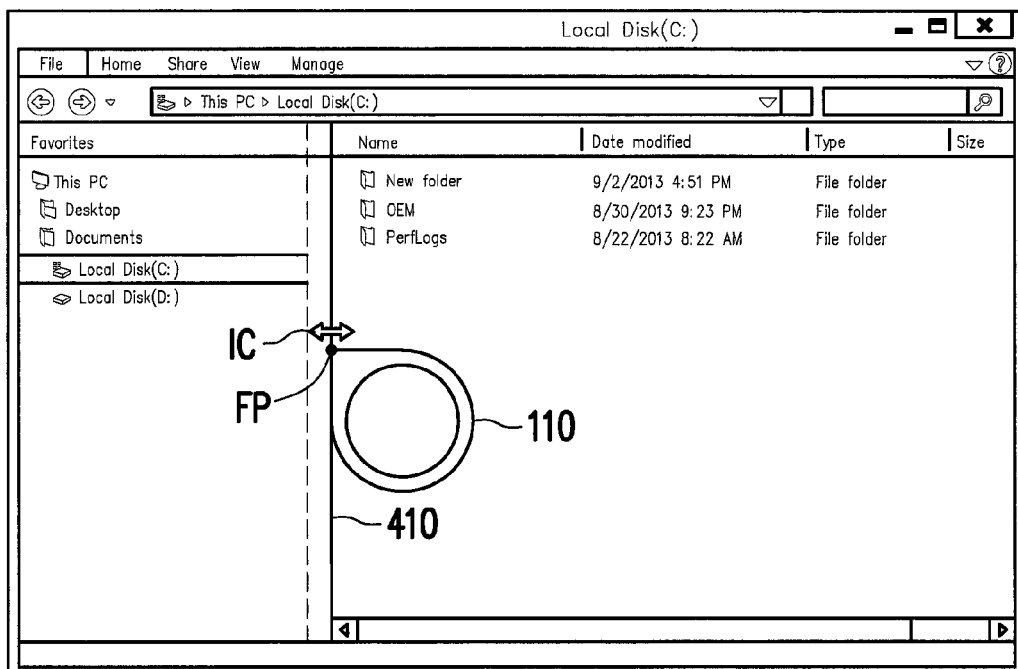
FIG. 5B is a schematic diagram illustrating a relation between a boundary-type dragging object and the touch cursor in the display interface according to an embodiment of the invention.

FIG. 5B is a schematic diagram illustrating a relation between a boundary-type dragging object and the touch cursor in the display interface according to an embodiment of the invention. Referring to FIG. 5B, when the processing unit 320 determines that the dragging object (e.g., the folder directory boundary 410) exists around the positioning point to display the dragging icon, and an operating signal corresponding to a dragging action of the touch cursor 110 is received from the touch screen 310, the processing unit 320 moves the dragging object (i.e., the folder directory boundary 410) to be associated with the positioning point FP of the touch cursor 110 (i.e., the folder directory boundary 410 is moved from a dash line to a place associated with the positioning point FP) and moves the dragging object (the folder directory boundary 410) with a movement of the positioning point FP.

On the user's perspective, when the user intends to drag the dragging object, as long as the touch cursor 110 is moved by utilizing fingers touching the touch screen 310 to move the positioning point FP to around the dragging object and the dragging action (e.g., long pressing, or long pressing and moving) is performed thereafter, the dragging object (e.g., the folder directory boundary 410) may be automatically associated to the positioning point FP of the touch screen 110 and moved together with the positioning point FP when the dragging action is performed. Accordingly, the user may drag the dragging object more easily.

It should be noted that, the dragging icon IC may be represented by other manners such as icons of other types, or a flickering line connected between the positioning point FP and the dragging object. Or, the dragging icon IC may be optionally implemented, and an implementation method thereof is not particularly limited by the invention.

Referring back to FIG. 4, in the present embodiment, said types of the dragging object also include the bar-type dragging object, such as a scroll bar 440 or a window title bar 450 in FIG. 4. The bar-type dragging object is also adapted to the embodiments as described in FIG. 5A to FIG. 5B. Unlike above-said boundary-type dragging object, a width of the bar-type dragging object is substantially greater than that of the boundary-type dragging object to facilitate the user in tapping and dragging easily. However, based on a display status of the display interface or restriction in design, when the user moves the touch cursor 110 to the bar-type dragging object and tap the touch screen 320 to start the dragging action, the bar-type dragging object may not necessarily be associated to the positioning point FP of the touch cursor 110 as similar to that of the boundary-type dragging object as described above.

For instance, when the user moves the touch cursor 110 to around the scroll bar 440 and starts the dragging action, since sizes of windows in the display interface 40 are fixed at the time, the scroll bar 440 may only be moved in up and down manner in relative to the positioning point FP without being necessarily associated with the positioning point FP, or a center of the scroll bar 440 may not be overlapping with the positioning point FP. Or, when a window corresponding to the window title bar 450 is maximized on the display interface 40, actions for determining whether the window title bar 450 exists around the positioning point FP thereby moving the dragging object are all disabled. In other words, although the touch control method (and the electronic device) provided in the invention aims to provide easy and intuitive operations for the user, said operations are still required to satisfy regulations of the display interface whenever necessary.

When the processing unit 320 determines that the bar-type dragging object exists around the positioning point, the dragging icon may also be displayed (e.g., the dragging icon IC of FIG. 5A). In order to be distinguished from the boundary dragging object, the dragging icon displayed when the bar-type dragging object exists may be different from the dragging icon displayed when the boundary-type dragging object exists. Or, when the bar-type dragging object cannot be automatically associated with the positioning point FP when the dragging action is performed by the user, different dragging icons may be displayed by the touch screen 310. Nevertheless, the invention is not limited to above-said configurations.

Figure 6:
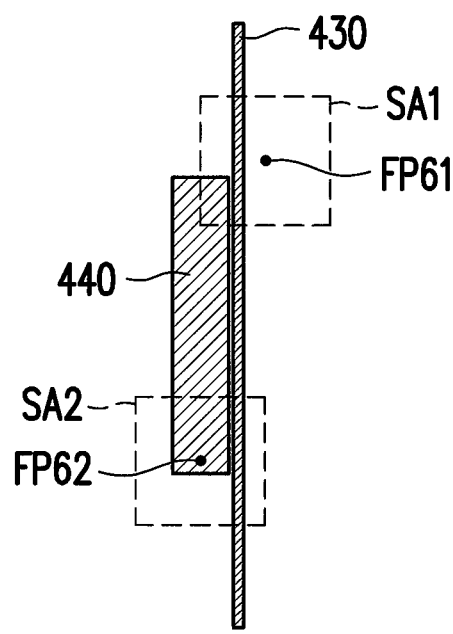
FIG. 6 is a schematic diagram illustrating a relation between a search area and a dragging object according to an embodiment of the invention.

In view of the display interface 40 depicted in FIG. 4, it can be known that in some cases, the search area established according to the positioning point FP may include one boundary-type dragging object and one bar-type dragging object at the same time. In these cases, the processing unit 320 is required to determine whether a target dragged by the user belongs to the boundary-type dragging object or the bar-type dragging object. FIG. 6 is a schematic diagram illustrating a relation between a search area and a dragging object according to an embodiment of the invention. For the users, since the boundary-type dragging object is relative more difficult to drag with respect to the bar-type dragging object, in the present embodiment, the processing unit 320 has higher priority in determining that the boundary-type is the dragging object that the user intends to drag.

For instance, referring to FIG. 6, when the positioning point is located at positioning point FP61 depicted in FIG. 6, the processing unit 320 determines that a search area SA1 established according to the positioning point FP61 includes two dragging objects: the window border 430 and the scroll bar 440. In this case, the processing unit 320 has higher priority in determining that the window border 430 (the boundary-type dragging object) is the dragging object that the user intends to drag, and the dragging icon corresponding to the boundary-type dragging object is displayed according to the window border 430. When the user controls the touch cursor to perform the dragging action, the processing unit 320 moves the window border 430 to be associated with the positioning point FP61, and moved with a movement of the positioning point FP61. When the positioning point is located at a positioning point FP62 depicted in FIG. 6, the processing unit 320 determines that a search area SA2 established according to the positioning point FP62 also includes the window border 430 and the scroll bar 440. However, since the position of the positioning point FP62 is overlapping with the scroll bar 440, the processing unit 320 may determine that the scroll bar 440 is the dragging object that the user intends to drag, and whether to move the scroll bar 440 according to the positioning point FP62 may be decided according to a current status of the display interface, and the scroll bar 440 may then be moved according to a movement of the positioning point FP62.

In other words, in the present embodiment, when the boundary-type dragging object exists in any one of search positions in the search area, the processing unit 320 may then determine that the dragging object exists around the positioning point (i.e., the positioning points FP61, FP62). Otherwise, in case of the bar-type dragging object, the processing unit 320 determines that the dragging object exists around the positioning point (i.e., the positioning points FP61, FP62) only when the bar-type dragging object exists at the position of the positioning point.

Figure 7:
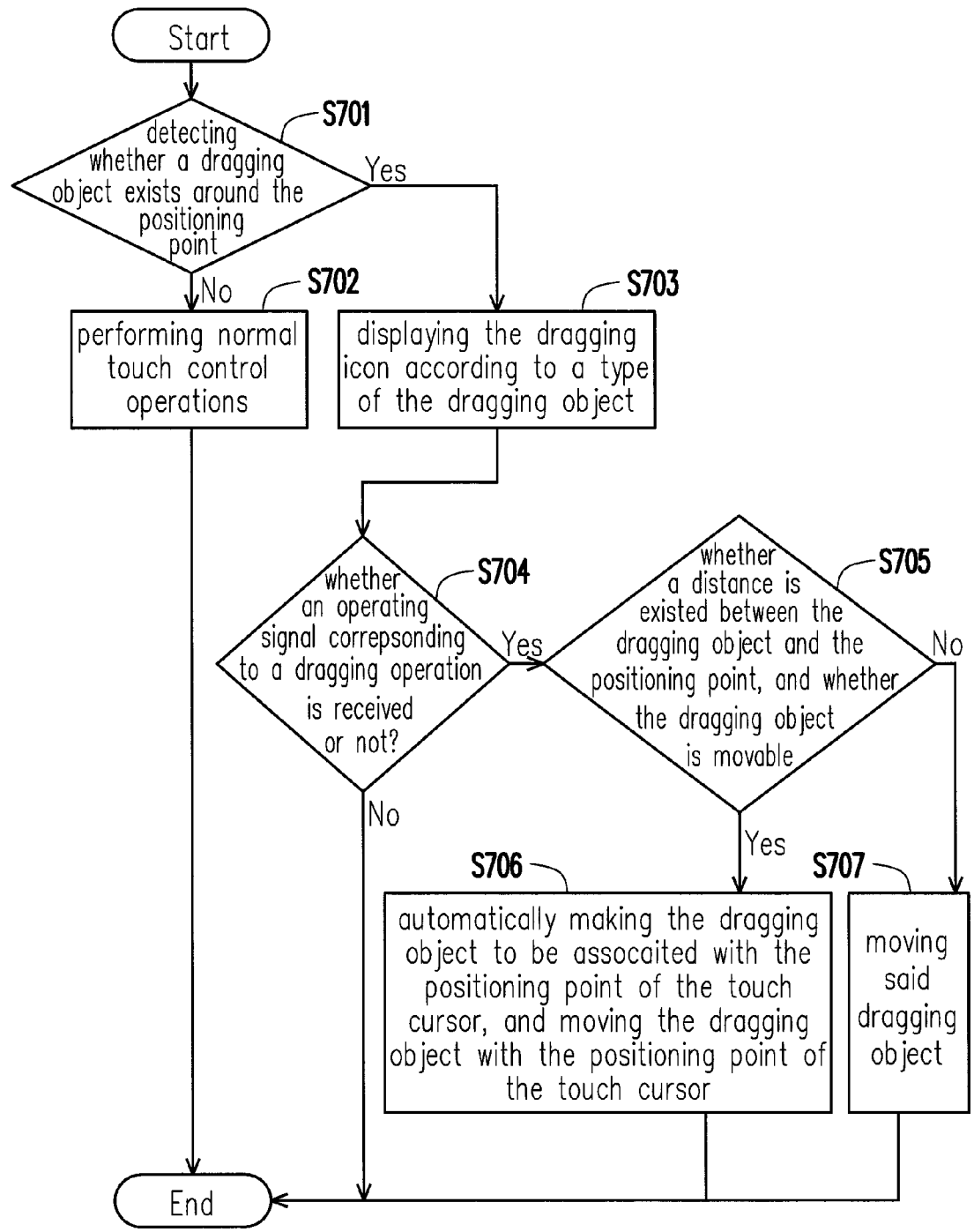
FIG. 7 is a flowchart illustrating a touch control method according an embodiment of the invention.

FIG. 7 is a flowchart illustrating a touch control method according an embodiment of the invention. In comparison with the embodiment depicted in FIG. 2, the embodiment depicted in FIG. 7 provides the implementation in more details. Referring to FIG. 7, first, the processing unit 320 detects whether a dragging object exists around the positioning point (e.g., the positioning point FP of the touch cursor 110 depicted in FIG. 1) of the touch cursor (step S701). If not, the processing unit 320 continues to monitor the touch screen 310 and receive normal touch control operations from the user (step S702). If the processing unit 320 detects that the dragging object exists around the positioning point, the processing unit 320 may display a dragging icon according to the type (e.g., the boundary-type or the bar-type) of the dragging object (step S703).

After the dragging icon is displayed, the processing unit 320 determines whether an operating signal corresponding to a dragging action is received from the touch screen 310 (step S704). If so, the processing unit 320 further determines whether a distance is existed between the dragging object and the positioning point, and whether the dragging object is movable (e.g., the bar-type dragging object may be subject to restriction of the display interface) (step S705). If both of above-said conditions are true, the processing unit 320 may automatically make the dragging object to be associated with the positioning point of the touch cursor, and move the dragging object with the positioning point of the touch cursor (i.e., moving with the dragging action of the user). If the distance is not existed between the dragging object and the positioning point, or the dragging object is unmovable, the processing unit 320 may move the dragging object according to the dragging action of the user (step S707).

In summary, the invention provides a touch control method and an electronic device capable of automatically detecting the dragging object around the touch cursor when the user uses the touch panel of the electronic device, and automatically associating said dragging object when dragging. As a result, the user may select and drag the dragging object which is difficult to tap and select (e.g., the window border, the classification field boundary or the folder directory boundary) in an easy and quick way.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A touch control method, adapted for an electronic device with a touch screen, comprising:
   displaying a touch cursor on the touch screen, wherein the touch cursor comprises a positioning point;
   detecting whether a dragging object exists around the positioning point; and
   moving the dragging object to be associated with the positioning point of the touch cursor and moving the dragging object according to a movement of the positioning point when determined that the dragging object exists around the positioning point and an operating signal corresponding to a dragging action of the touch cursor is received from the touch screen.

2. The touch control method of claim 1, wherein after the step of detecting whether the dragging object exists around the positioning point, the touch control method further comprises:
   displaying a dragging icon around the positioning point of the touch cursor when determined that the dragging object exists around the positioning point.

3. The touch control method of claim 1, wherein the dragging object comprises a boundary-type dragging object and a bar-type dragging object.

4. The touch control method of claim 3, wherein the step of detecting whether the dragging object exists around the positioning point comprises:
   establishing a search area according to the position of the positioning point, wherein the search area comprises a plurality of search positions, and the search area covers the positioning point; and
   searching the search positions in the search area for determining whether the boundary-type dragging object exists in one of the search positions, and determining that the dragging object exists around the positioning point when determined that the boundary-type dragging object exists in one of the search positions in the search area.

5. The touch control method of claim 3, wherein the step of detecting whether the dragging object exists around the position of the positioning point comprises:
   determining whether the bar-type dragging object exists at the position of the positioning point, and determining that the dragging object exists around the positioning point when determined that the bar-type dragging object exists at the position of the positioning point.

6. An electronic device, comprising:
   a touch screen; and
   a processing unit, coupled to the touch screen,
   wherein the processing unit controls the touch screen to display a touch cursor, wherein the touch cursor comprises a positioning point;
   the processing unit detects whether a dragging object exists around the positioning point; and
   the processing unit moves the dragging object to be associated with the positioning point of the touch cursor and moves the dragging object according to a movement of the positioning point when the processing unit determines that the dragging object exists around the position of the positioning point and an operating signal corresponding to a dragging action of the touch cursor is received from the touch screen.

7. The electronic device of claim 6, wherein
   the processing unit displays a dragging icon around the positioning point of the touch cursor when determined that the dragging object exists around the positioning point.

8. The electronic device of claim 6, wherein the dragging object comprises a boundary-type dragging object and a bar-type dragging object.

9. The electronic device of claim 8, wherein
   the processing unit establishes a search area according to the position of the positioning point, wherein the search area comprises a plurality of search positions, and the search area covers the positioning point; and
   the processing unit searches the search positions in the search area for determining whether the boundary-type dragging object exists in one of the search positions, and the processing unit determines that the dragging object exists around the positioning point when determined that the boundary-type dragging object exists in one of the search positions in the search area.

10. The electronic device of claim 8, wherein
    the processing unit determines whether the bar-type dragging object exists at the position of the positioning point, and the processing unit determines that the dragging object exists around the positioning point when determined that the bar-type dragging object exists at the position of the positioning point.

\* \* \* \* \*